Figure 1:
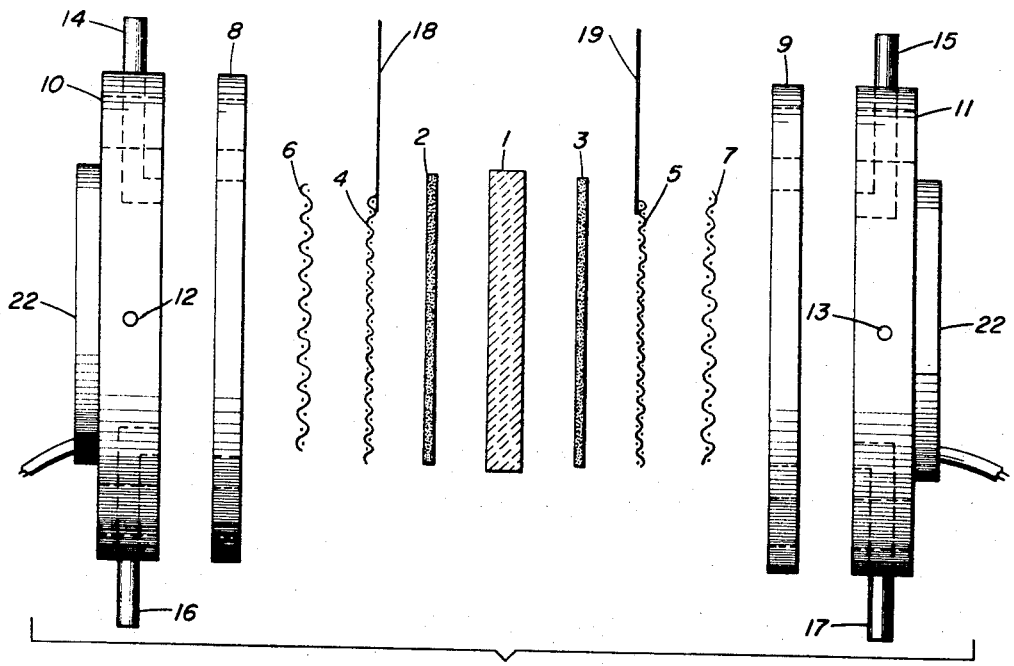

Oct. 22, 1968   H. P. LANDI   3,407,096
FUEL CELL AND METHOD FOR PREPARING THE ELECTRODES
Filed Jan. 25, 1966

INVENTOR.
HENRY PATRICK LANDI
BY
ATTORNEY

United States Patent Office 3,407,096
Patented Oct. 22, 1968

3,407,096
FUEL CELL AND METHOD FOR PREPARING THE ELECTRODES
Henry Patrick Landi, Yorktown Heights, N.Y., assignor to American Cyanamid Company, Stamford, Conn., a corporation of Maine
Filed Jan. 25, 1966, Ser. No. 522,964
8 Claims. (Cl. 136—86)

The present invention concerns itself with an improved catalytic electrode structure and process for preparing such structure suitable for use in typical electrolyte or matrix fuel cells, such as, for instance, hydrogen-oxygen, hydrogen-air, hydrazine-oxygen or ammonia-air fuel cells. More particularly, the invention relates to the preparation of a catalytic electrode structure characterized as being self-supporting, unsintered, flexible, resilient, extensively fibrillated, polytetrafluoroethylene-waterproofed and electrically conductive.

As is well-known, catalytic electrodes prepared for use in fuel cells are usually either brittle or have no coherence and strength. In order to obviate this deficiency, catalytic electrodes are prepared utilizing a metal screen. Such electrodes are heavier and generally no longer flexible. Further, they require special treatment and handling due to the likelihood of corrosion of the metallic screen backing or grid employed.

It is, therefore, a principal object of the invention to provide a self-supporting, unsintered, flexible, extensively fibrillated, electrically conductive structure which is flexible and resilient but does not require a supporting screen, wire or plastic mesh or grid for strength and collection of current. It is a further object of the invention to provide a straightforward and economical method for preparing the aforementioned electrode utilizing a novel technique for preparing an electrically conductive, flexible structure. Other objects and advantages will be readily ascertained from a consideration of the ensuing description.

It has been found that an electrode structure of enhanced performance can be readily prepared by vigorously blending as by mixing or milling polymethylmethacrylate, a polytetrafluoroethylene dispersion and a conductive filler, such as graphite or a non-noble metal, at a temperature between about 170° C. and 200° C. The heated admixed blend is cooled to about room temperature, pellitized, and extruded into a sheet. This sheet is next treated with acetone to extract polymethylmethacrylate and, finally, died. Unexpectedly, all the conductive filler remains intact in the extensively fibrillated polytetrafluoroethylene phase unaffected by acetone extraction. There is then obtained a realtively light weight, electrically conductive, self-supporting, porous, unsintered, extensively fibrillated electrode structure. Finally, the latter is subjected, if desired, to treatment with catalyst by methods well known in the art. There is then obtained a resultant porous catalytic electrode which is flexible, self-supporting and resilient.

According to the process of the invention, there is eliminated a waterproofing step usually performed upon completion of the step of blending conductive filler and catalyst. This prior are procedure results in a substantially brittle electrode structure. In the instant process, however, the waterproofing operation occurs while simultaneously admixing vigorously conductive filler to obtain a self-supporting structure. Surprisingly, polytetrafluoroethylene is extensively fibrillated and, as such, is capable of maintaining the conductive filler in the polytetrafluoroethylene phase.

In general, polymethylmethacrylate is heated and milled to a molten, viscous state, usually on a rubber mill maintained at a temperature usually between 170° C. and 180° C. Polytetrafluoroethylene in the form of an aqueous dispersion of finely divided particles, preferably in the range of from about 0.05 and 1.0 micron, is gradually added to the molten polymethylmethacrylate in which there is formed interwoven and interconnected polytetrafluoroethylene fibrils. As milling takes place, water is volatilized from the dispersion and graphite or equivalent conductive filler is next incorporated. If desired, there may also be added an extractable filler, such as Cab-o-sil, for instance, to partially or completely replace the graphite or other conductive filler. The blend is removed from the mill and ground into pellets which are extruded directly by conventional techniques. The later is subsequently compression molded. A sheet of any desired shape, size or form is thereby formed. Thereafter, the polymethylmethacrylate is completely extracted from the resultant structure by utilizing several washings in acetone. Further separate washings of the treated sheet with ethyl alcohol and water are followed by drying the same as by rolling between, for instance, blotter paper. Where an extractable filler, such as Cab-o-sil, is present, filler can be readily extracted, for instance, washing with an aqueous caustic solution will remove colloidal silica and an aqueous acidic solution will remove colloidal alumina. As a final step in the overall operation, an active catalyst is incorporated in place of, or in addition to, voids supplied by the extracted polymethylmethacrylate. This is accomplished by impregnating the resultant structure, for instance, in an alcoholic solution of chloroplatinic acid followed by thermal degradation of the latter acid in the presence of hydrogen. The resultant structure can be readily employed as an electrode in fuel cells in which no additional metallic grid need be supplied to support such a structure.

The electrode bears less weight than corresponding known structures due to its porosity and to its omission of desired grid or metallic supporting structure.

The catalyst incorporated in the electrode to render the same active in a fuel cell environment can be achieved by various methods. One of these is to include the catalyst along with the conductive filler material, such as by depositing the catalyst thereon prior to the filler's addition. Deposited catalyst on conductive filler is then incorporated into the electrode structure prior to extraction of the polymethylmethacrylate. Alternatively, the structure may be initially formed, as above indicated, and thereafter depositing on a formed sheet sufficient catalyst by electrochemical or thermal reduction techniques. The catalyst per se may include, for instance, noble metals, such as platinum, or catalyst non-noble metals, such as nickel, silver and mercury-silver mixtures.

Illustrative conductive filler include, for example, graphite, or carbons recovered from calcium cyanamide production or any desired pulverized metal compounds, such as, for instance, nickel or tantalum metal powder, tungsten carbide, titanium carbide, magnetite and equivalents thereof.

In the preparation of the water-proofed structure, a good operating range of ingredients comprises the following components by weight: 60 to 98 parts of polymethylmethacrylate, 2 to 40 parts of polytetrafluoroethylene and from 2 to 98 parts of filler which when added will constitute between 50% and about 98% of the over-all electrode structure. Insofar as catalyst loading is concerned, any desired quantity, preferably between 1 and about 10 milligrams per square centimeter of surface, is within the contemplated range of the present invention.

A self-supporting, porous, unsintered, flexible, resilient, extensively fibrillated polytetrafluoroethylene electrode, as hereinabove described, can be cut to any desired shape and incorporated in a fuel cell. For instance, there is employed in such a cell a matrix or membrane which separates the electrode so-prepared in accordance with the process of the present invention. If desired, there may be employed along with the electrode prepared hereinabove, separated by the matrix on one side, a standard electrode prepared by well-known procedures in the art.

The matrix or membrane element of the fuel cell is saturated either with an acid or alkaline electrolyte. As a matrix, there may be employed ordinary filter paper, asbestos fiber paper as well as polymeric membranes containing commercially available ion-exchange resin materials. The latter may be also employed in either a leached or water-equilibrated state. As a typical matrix, there may be used ordinary filter paper saturated with either 85% phosphoric acid, 5 N sulfuric acid or 8 N potassium hydroxide.

In general, one preferred hereinbelow defined fuel cell which falls within the purview of the present invention comprises three essential elements: base electrolyte, electrodes or electrocatalysts, one of which comprises the electrode of the present invention, and current collectors. Suitable collectors can be perforated, or corrugated plates or metallic screens and equivalents thereof.

In order to further clarify the invention, these and other embodiments thereof are shown in the accompanying drawing and will be described in detail in conjunction with said drawing.

Figure 2:
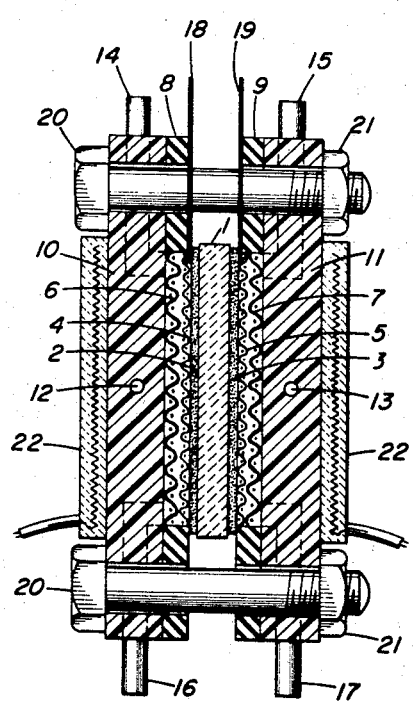

FIGURE 1 is an exploded plan view, partially in section, of a fuel cell employing the electrode of the present invention, and FIGURE 2 is a partially expanded side view, partially in section, of the fuel cell of FIGURE 1.

In FIGURE 1, a 5 N potassium hydroxide saturated filter paper membrane 1, is positioned between a fuel electrode 2 of the invention and an oxygen electrode 3 comprising platinum, palladium or silver. Abutting the latter electrodes are current collector screens 4 and 5 which comprise nickel or other suitable inert metal. Nickel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as polytetrafluoroethylene or silicone rubber. These seal as well as separate the chambers containing reactants. Exterior to the gaskets are housing members 10 and 11 to which are attached thermocouple 12 and heat control probe 13 and having inlet stainless steel or other inert metal tubings 14 and 15 through which hydrogen and oxygen are separately introduced into the fuel cell. Stainless steel tubings 16 and 17 are provided as vents for unused gases. Ribbon leads 18 and 19, connected to current collector screens 4 and 5 by spot welding are the conductive members through which current flows from and to the fuel cell through the external circuit when the fuel cell is in operation. The cell, secured by means of bolts 20 and nuts 21 as shown in FIGURE 2, can be heated, if desired, by an external electrical heating pad 22. The temperature of the cell, determined by the thermocouple 12, is controlled by heat control probe 13.

Performance of electrodes prepared from noble metal compounds and mixtures of such metal compounds is set forth in the following examples which are merely illustrative and not to be taken as limitative of the invention. Further, each of the examples incorporates the fuel cell defined by the above drawing. Unless otherwise stated, the parts are by weight.

EXAMPLE 1

95 parts of polymethylmethacrylate are heated and milled to a molten viscous state on a rubber mill maintained at a temperature between 170° C. and 175° C. 5 parts of polytetrafluoroethylene as a 60% aqueous emulsion and 20 parts of graphite obtained as a by-product in the manufacture of calcium cyanamide are blended into the molten polymethylmethacrylate. Upon cooling of the blend, the latter is ground into pellets and injection molded into a ⅛ inch x 2 inch x 4 inch plaque. The plaque is next compression molded at temperatures between 180° C. and 200° C. and at a pressure of about 1000 p.s.i. into a sheet 30 mils thick and 6 inches square. The latter sheet is then immersed in acetone for 16 hours at 25° C. so as to extract polymethylmethacrylate therefrom. Thereafter, the sheet is washed with acetone for 1 to 2 hours in two subsequent washings. This sheet is dark gray in color, flexible and is found to be from 9 to 11 mils thick.

A portion of the above-prepared sheet is impregnated with a 10% solution of chloroplatinic acid in ethanol and heated to remove solvent. The dry sheet is recovered on solvent removal. It is then subjected to nitrogen at 300° C. and then to hydrogen at 100° C. for 30 minutes so as to reduce the chloroplatinic acid to platinum. A catalyzed electrode containing 1.3 milligrams of platinum per square centimeter is obtained.

One inch diameter discs are cut from the so-prepared electrode sheet and tested both as an hydrogen and as an oxygen electrode against a 9 milligram platinum per square centimeter standard electrode in matrix fuel cells using 5 N potassium hydroxide and 5 N sulfuric acid electrolyte at 70° C. The results of these tests are shown in Table I below.

TABLE I

| Matrix Having Electrolyte As— | Current Density (ma./cm.²) | | | | | |
|---|---|---|---|---|---|---|
| | As an H₂— Electrode at— | | | As an O₂— Electrode at— | | |
| | .85 volt | .80 volt | .75 volt | .85 volt | .80 volt | .75 volt |
| 5 N H₂SO₄ | 8 | 18 | 40 | | | 2 |
| 5 N KOH | 70 | 100 | 130 | 40 | 140 | 200 |

EXAMPLE 2

An electrode sheet having a thickness between 19 and 22 mils is prepared from a blend of 95 parts of polymethylmethacrylate, 5 parts of polytetrafluoroethylene and 33 parts of graphite and catalyzed in accordance with the procedure set forth in Example 1 above. The so-prepared electrode is tested in the same manner as the electrode set forth in Example 1. The results of this test are set forth in Table II below.

TABLE II

| Matrix Having Electrolyte As— | Current Density (ma./cm.²) | | | | | |
|---|---|---|---|---|---|---|
| | As an H₂— Electrode at— | | | As an O₂— Electrode at— | | |
| | .85 volt | .80 volt | .75 volt | .85 volt | .80 volt | .75 volt |
| 5 N H₂SO₄ | 60 | 120 | 180 | | | |
| 5 N KOH | 10 | 15 | 20 | 30 | 65 | 120 |

EXAMPLE 3

To show the of reduction in thickness of an electrode sheet, the following example demonstrates this relationship insofar as performance is concerned. The thickness of the electrode sheet as prepared in Example 2 above is reduced to 15 mils by compressing the plaque containing the polymethylmethacrylate to 20 mils thickness and 6 inches square and tests as performed in Example 2 are repeated herein. The results of these tests are shown in Table III below.

TABLE III

| Matrix Having Electrolyte As— | Current Density (ma./cm.²) | | | | | |
|---|---|---|---|---|---|---|
| | As an H₂— Electrode at— | | | As an O₂— Electrode at— | | |
| | .85 volt | .80 volt | .75 volt | .85 volt | .80 volt | .75 volt |
| 5 N H₂SO₄ | 50 | 120 | 180 | 8 | 17 | 35 |
| 5 N KOH | 70 | 110 | 135 | 40 | 100 | 140 |

EXAMPLE 4

An electrode sheet is prepared by blending together 97.5 parts of polymethylmethacrylate, 2.5 parts of polytetrafluoroethylene and 17 parts of graphite. Employing the procedure set forth in Example 1 above, the sheet is sufficiently compressed so that its thickness is equal to between 10 and 11 mils. Utilizing the fuel cell described above, the performance of the electrode in tabulated form is shown in Table IV below.

TABLE IV

| Matrix Having Electrolyte As— | Current Density (ma./cm.²) | | | | | |
|---|---|---|---|---|---|---|
| | As an H₂— Electrode at— | | | As an O₂— Electrode at— | | |
| | .85 volt | .80 volt | .75 volt | .85 volt | .80 volt | .75 volt |
| 5 N H₂SO₄ | 70 | 130 | 200 | | | 5 |
| 5 N KOH | 40 | 48 | 55 | 40 | 90 | 125 |

EXAMPLE 5

To demonstrate marked variations in conductivity exhibited by the electrodes as prepared in accordance with the process of the invention, graphite levels are increased from 50% to 95%. Further, variations in conductivity are observed where platinization of graphite filled electrodes is performed.

Conductivity in terms of resistance is determined by preparing samples by the procedure of Example 1, above, at both varying polytetrafluoroethylene and graphite levels. A portion of each sample is also platinized so as to impart thereto from 0.6 milligram per square centimeter to 2.0 milligrams per square centimeter. The measurements, as such, are made by maintaining a one square centimeter sample between brass plates under a fifty pound force. The resistances in ohms measured on an AC bridge are set forth in Table V below.

TABLE V

| Electrode sample: | Resistance in ohms |
|---|---|
| 50% graphite, 50% PTFE¹ | >1000 |
| 50% graphite, 50% PTFE¹ with 2 mg./cm.² Pt | 13.1 |
| 75% graphite, 25% PTFE¹ | 75 |
| 75% graphite, 25% PTFE¹ with 2 mg./cm.² Pt | 0.5 |
| 92% graphite, 8% PTFE¹ | 0.24 |
| 92% graphite, 8% PTFE¹ with 0.8 mg./cm.² Pt | 0.17 |
| 95% graphite, 5% PTFE¹ | 0.126 |
| 95% graphite, 5% PTFE¹ with 0.6 mg./cm.² Pt | 0.120 |

¹ PTFE is defined as polytetrafluoroethylene.

Advantageously, each of the electrode structures described in the examples has a tensile modulus of elasticity in tension equal to about 8000 p.s.i. and has a percent elongation at rupture of at least 25%. Further, each is characterized as having a total porosity between 50% and 75% and a mean pore diameter of between 0.2 and 1 micron having a permeabiilty to 6 molar phosphoric acid at 25° C. equal to at least one atmosphere, wherein the permeability is defined as the differential pressure in atmospheres required to force aqueous electrolyte through the electrode structure. Hence, the electrode of the invention bears less weight than correspondingly known structures due to its porosity and its omission of desired grid or other metallic supporting structures.

Although polytetrafluoroethylene per se has been described above, it is contemplated that a portion thereof, between about 5% and 95%, may be substituted by other inert thermoplastic resins, such as polyhalogenated hydrocarbons and polyethers. Exemplary of the latter are polymonochlorotrifluoroethylene, polyformaldehyde and polyphenyleneoxide. When utilizing such mixtures in the process of the invention, enhanced mechanical strength of the overall electrode structures is noted.

I claim:
1. A process for preparing the electrode structure of claim 6 which comprises the steps of: heating at a temperature ranging from about 170° C. to about 200° C. 60 to 98 parts, by weight, of polymethylmethacrylate to a molten viscous state, blending the latter with from 2 to 40 parts, by weight, of polytetrafluoroethylene in the form of finely divided particles as an aqueous dispersion and from 2 to 98 parts, by weight, of a conductive filler, cooling the blended mixture, pelletizing the latter and extruding the so-formed pellets directly into a sheet, treating the latter sheet with a suitable selective solvent for polymethylmethacrylate, extracting polymethylmethacrylate from said sheet and recovering an electrically-conductive, porous, self-supporting, unsintered, extensively fibrillated electrode structure.

2. A process according to claim 1 wherein the conductive filler is graphite.

3. A process according to claim 1 wherein the selective solvent is acetone.

4. A process according to claim 1 wherein the so-formed structure is further subjected to treatment with a catalyst mixture whereby a catalytic electrode is formed.

5. A process according to claim 4 wherein the catalyst employed comprises platinum.

6. A fuel cell comprising in combination: an electrolyte-saturated matrix and an improved electrode structure, said structure characterized as being an electrolyte-wettable, electrically-conductive, self-supporting, flexible, resilient, porous, unsintered, extensively fibrillated, interwoven and interconnected polytetrafluoroethylene electrode structure having incorporated therein a catalytically-coated conductive filler, said filler constituting between 50% and 98% by weight of the over-all electrode structure, wherein said structure possesses (a) a tensile modulus equal to about 8000 p.s.i., (b) a percent elongation at rupture of at least 25%, (c) a porosity between 50% and 75% and (d) a mean pore diameter between about 0.2 and 1 micron, having a permeabiilty to 6 molar phosphoric acid at 25° C. equal to at least one atmosphere.

7. A fuel cell according to claim 6 wherein the electrode structure incorporates graphite as the conductive filler.

8. A fuel cell according to claim 6 wherein the electrode structure incorporates nickel metal powder as the conductive filler.

References Cited
UNITED STATES PATENTS

| 3,120,457 | 2/1964 | Duddy | 136—120 |
| 3,158,510 | 11/1964 | Talvenheimo | 136—120 |
| 3,198,667 | 8/1965 | Gladrow et al. | 136—122 |
| 3,252,839 | 5/1966 | Langer et al. | 136—86 |
| 3,003,912 | 10/1961 | Harford | 162—157 |
| 3,265,557 | 8/1966 | Fries et al. | 162—138 |

FOREIGN PATENTS

| 989,216 | 4/1965 | Great Britain. |

WINSTON A. DOUGLAS, *Primary Examiner.*

A. SKAPARS, *Assistant Examiner.*